March 22, 1927.
S. E. CLINE
1,621,524
LAWN MOWER SHARPENER
Filed Feb. 11, 1925     2 Sheets-Sheet 1
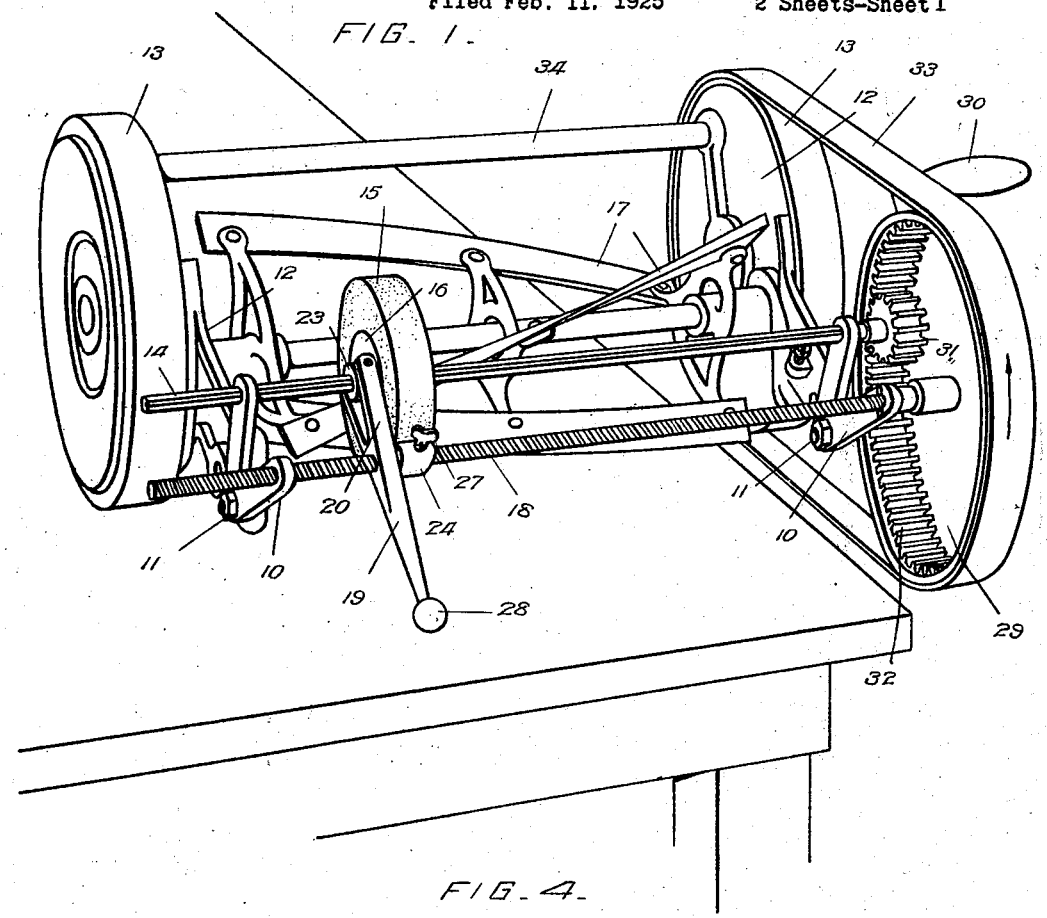
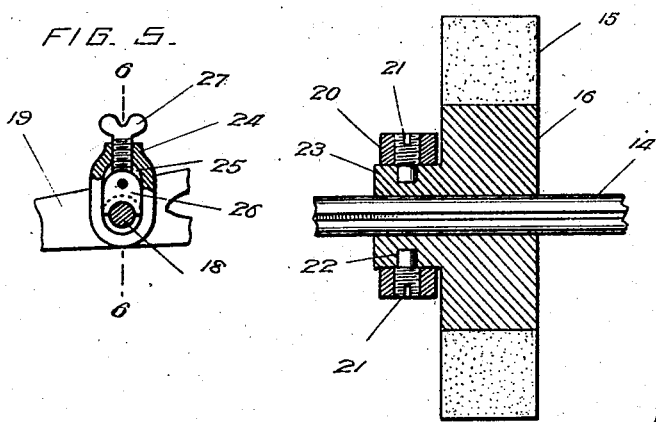
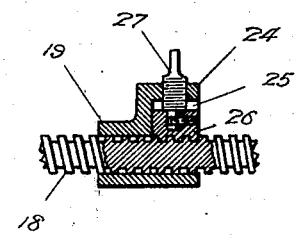
Inventor:
S. E. CLINE,
By Monroe E. Miller
Attorney.

March 22, 1927.

S. E. CLINE 1,621,524

LAWN MOWER SHARPENER

Filed Feb. 11, 1925 2 Sheets-Sheet 2

Inventor:
S. E. CLINE,
By Monroe E. Miller
Attorney.

Patented Mar. 22, 1927.

1,621,524

UNITED STATES PATENT OFFICE.

SANFORD E. CLINE, OF GREENSBURG, INDIANA.

LAWN-MOWER SHARPENER.

Application filed February 11, 1925. Serial No. 8,481.

The present invention relates to lawn mower sharpeners, and aims to provide a novel and improved device for attachment to a lawn mower for conveniently and efficiently sharpening the blades of the rotary cutter thereof.

It is an object of the invention to provide a sharpening device of that kind comprising a simple construction which can be quickly and conveniently applied to a lawn mower and which will operate in a convenient and efficient manner.

Another object of the invention is to provide such a device including a grinding wheel mounted for rotary and sliding movements to sharpen the cutting edges of the blades, with means for rotating said grinding wheel and moving same longitudinally of the rotary cutter of the lawn mower, and, at the same time, rotating the rotary cutter of the lawn mower so that the blades of cutter are simultaneously sharpened from end to end.

A further object of the invention is to provide a lawn mower sharpener which is adjustable so as to be applicable to different types and sizes of lawn mowers.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein—

Figure 1 is a perspective view of the sharpener as applied to a lawn mower, with the handle, stationary blade, roller and other parts of the lawn mower removed.

Fig. 4 is an enlarged diametrical section of the grinding wheel taken on the line 4—4 of Fig. 2.

Fig. 5 is a sectional detail taken on the line 5—5 of Fig. 3.

Fig. 6 is a section on the line 6—6 of Fig. 5.

Figure 3:
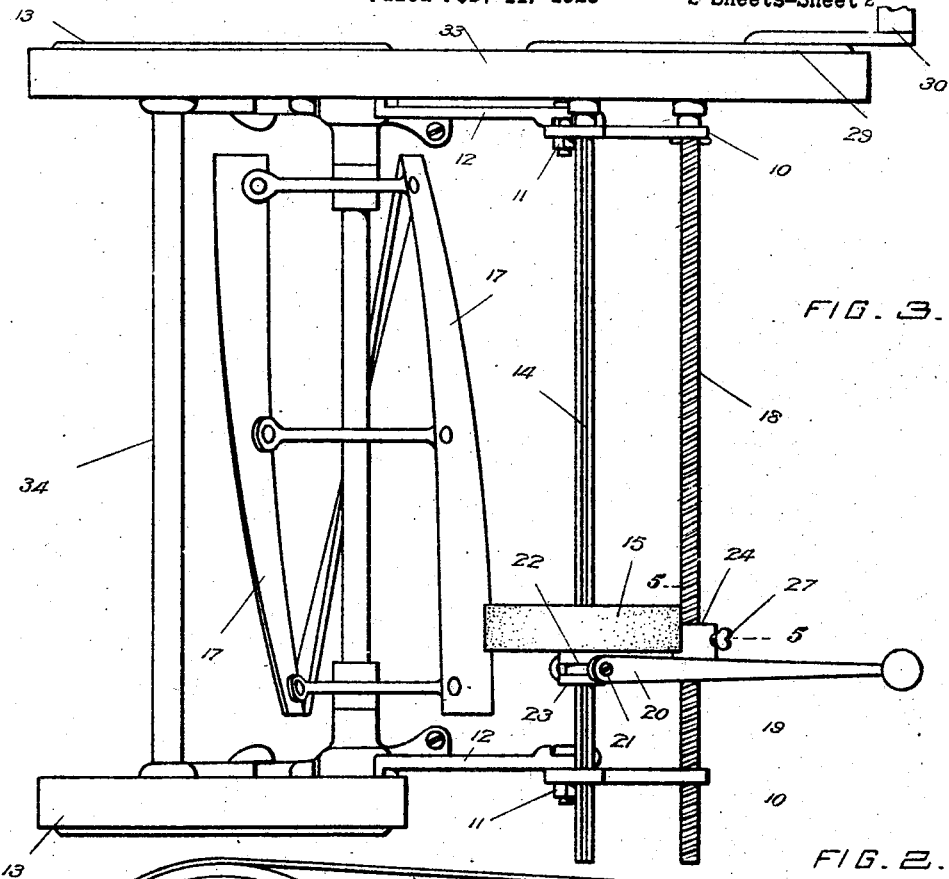
Fig. 3 is a plan view of the parts as shown in Fig. 1.

The sharpening device comprises a pair of supporting brackets 10 which are attached by bolts 11 or other securing elements to the side or end plates 12 of the lawn mower frame, on which plates the ground wheels 13 of the lawn mower are mounted for rotation, the stationary blade and roller of the lawn mower having been removed, and the bolts 11 can be inserted in the apertures or slots of the plates 12 which usually accommodate the roller. A shaft 18 is mounted for rotation in the brackets 10 parallel with the axis of the rotary cutter of the lawn mower, and a grinding wheel 15 of suitable abrasive material has a metal hub 16 mounted slidably upon said shaft and feathered or splined on the shaft to rotate therewith. A periphery of the wheel 15 is adapted to contact with the cutting edges of the blades 17 of the rotary cutter.

In order to move the grinding wheel 15 longitudinally on the shaft 14 while the grinding wheel is being rotated, a screw rod or shaft 18 is journaled for rotation in the brackets 10 behind the shaft 14, and carries a member 19 which has a swivel connection with the hub 16. Thus, the member 19 has a fork 20 carrying screws or studs 21 engaging in an annular groove 22 in a boss 23 of the hub 16, compelling the grinding wheel to move with the member 19 longitudinally of the shafts 14 and 18. The member 19 has a boss 24 provided with a recess 25 in which a nut member 26 is slidable into and out of engagement with the screw-thread of the shaft 18. A thumb screw 27 is carried by the boss 24 and is swivelled in the nut member 26 for moving said nut member into and out of engagement with the shaft 18, said screw being readily rotated by hand. The member 19 extends downwardly and rearwardly and is provided at its rear terminal with a knob or ball 28 to rest on a table top or other surface on which the lawn mower is placed during the sharpening operation, as will hereinafter more fully appear.

In order to rotate the shafts, a wheel 29 of about the same diameter and form as the lawn mower wheels 13 is secured on one end of the screw shaft 18, and has a hand crank 30 for conveniently rotating said wheel 29 by hand, thereby rotating the shaft 18. The shaft 14 is rotated at a higher speed. Thus, a pinion 31 is secured on the corresponding end of the shaft 14 and meshes with internal gear teeth 32 with which the rim of the wheel 29 is provided. The wheel 29 also provides a pulley wheel for driving the rotary cutter of the lawn mower, a belt 33 being placed around the wheel 29 and the corresponding wheel 13 of the lawn mower.

After the handle, stationary cutter blade and roller of the lawn mower have been removed, the sharpener can be quickly attached by securing the brackets 10 to the plates 12. The shafts 14 and 18 are of sufficient length so as to accommodate lawn mowers having rotary cutters of different lengths, and the brackets 10 can be spaced apart different distances. Furthermore, the brackets 10 can be swung forwardly and rearwardly so as to position the grinding wheel 15 to contact properly with the cutting edges of the blades 17. The bolts 11 are tightened to maintain the adjustment so that the grinding wheel will uniformly grind the cutting edges of the blades 17.

Figure 2:
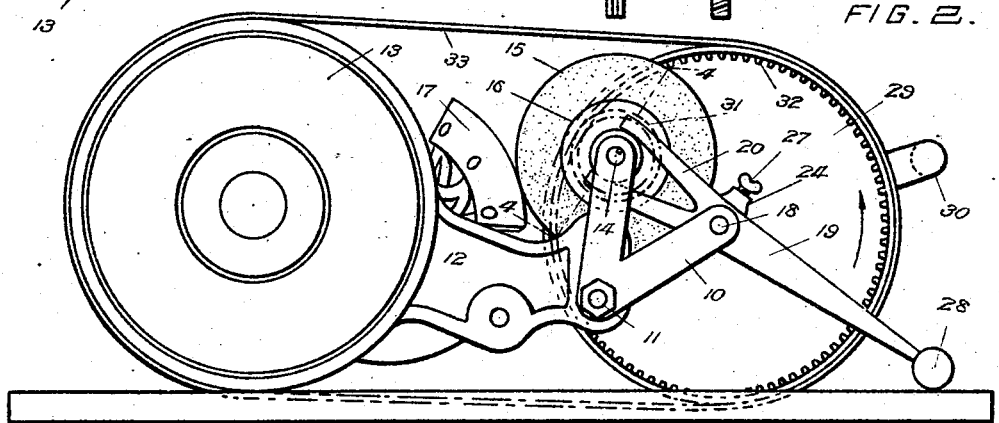
Fig. 2 is a side elevation.

As shown in Fig. 1, the lawn mower, with the sharpener applied, is preferably placed on the top of a table or similar support, with the left hand wheel 13 resting on the support, the right hand wheel 13 and drive wheel 29 spaced from or clear of the support, and the ball or foot 28 of the member 19 resting slidably on the support. The operation is started with the grinding wheel at the left hand end. The crank 30 is grasped by the right hand for driving the sharpener, and the right hand side of the lawn mower can be supported by grasping the cross rod 34 of the lawn mower by the left hand, although the lawn mower can be supported in any suitable manner during the sharpening action. The wheel 29 is rotated (counter-clock-wise as seen in Figs. 1 and 2), thereby rotating the shaft 14 and grinding wheel 15 in the same direction at a higher speed, the periphery of the grinding wheel moving downwardly where it contacts with the blades 17. The belt 33 transmits power to the right hand wheel 13 of the lawn mower, thereby rotating the rotary cutter of the lawn mower in the same direction (counter-clock-wise as seen in Figs. 1 and 2), so that the blades 17 move upwardly where they contact with the grinding wheel. The contacting portions of the blades 17 and grinding wheel thus move in opposite directions. During the rotation of the lawn mower cutter and grinding wheel the shaft 18 being rotated will, by the engagement of the nut member 26 therewith, slide the grinding wheel on the shaft 14 so that the blades 17 are sharpened from end to end, the grinding wheel moving from the left hand ends of the blades to the right hand ends thereof. If the sharpening action is to be repeated, the screw 27 is rotated to disengage the nut member 26 from the screw thread of the shaft 18, and the grinding wheel is then conveniently slid back to initial or starting position, after which the nut member 26 is again engaged with the shaft 18.

The left hand wheel 13 which seats on the support need not rotate, inasmuch as the rotary cutter can rotate in the usual operative direction with reference to either of the wheels 17 by the provision of the usual ratchet connections of the rotary cutter with the wheels 13 (not shown) as well known in the art. The left hand wheel 13 and member 19 resting on the support will support the greater part of the weight of the lawn mower and attachment, the member 19 sliding on the support as the grinding wheel is shifted on the shaft 14.

Having thus described the invention, what is claimed as new is:—

1. A lawn mower sharpener comprising brackets having means for attaching them to the frame of a lawn mower, two shafts mounted for rotation in said brackets, a grinding wheel slidable on and rotatable with one of said shafts, the other shaft having a member mounted on the second named shaft and cooperable with the grinding wheel to move the grinding wheel with it, and means for rotating said shafts, said member being provided with a projecting portion to bear slidably on a supporting surface on which the lawn mower is placed.

2. A lawn mower sharpener comprising two shafts, means for mounting them for rotation, a grinding wheel slidable on and rotatable with one of said shafts, the other shaft having a screw thread, a member mounted on the second named shaft and arranged for moving the grinding wheel with it, a driving wheel on one of said shafts, a belt for connecting said driving wheel with one wheel of a lawn mower, and internal gear connection between said driving wheel and the other shaft.

In testimony whereof I hereunto affix my signature.

SANFORD E. CLINE.